(12) United States Patent
Patterson et al.

(10) Patent No.: US 6,802,026 B1
(45) Date of Patent: Oct. 5, 2004

(54) PARAMETERIZABLE AND RECONFIGURABLE DEBUGGER CORE GENERATORS

(75) Inventors: Cameron D. Patterson, Longmont, CO (US); Timothy O. Price, Toronto (CA)

(73) Assignee: Xilinx, Inc., San Jose, CA (US)

( * ) Notice: Subject to any disclaimer, the term of this patent is extended or adjusted under 35 U.S.C. 154(b) by 570 days.

(21) Appl. No.: 09/858,809

(22) Filed: May 15, 2001

(51) Int. Cl.$^7$ ................................................ G06F 11/00
(52) U.S. Cl. ........................................ 714/35; 712/227
(58) Field of Search .............................. 714/34, 35, 37, 714/39, 43, 31, 30, 32, 38, 51; 712/227, 244, 233

(56) References Cited

U.S. PATENT DOCUMENTS

| | | | | |
|---|---|---|---|---|
| 6,107,821 A | * | 8/2000 | Kelem et al. .................. | 326/38 |
| 6,247,147 B1 | * | 6/2001 | Beenstra et al. .............. | 714/39 |
| 6,311,316 B1 | * | 10/2001 | Huggins et al. .............. | 716/12 |
| 6,366,117 B1 | * | 4/2002 | Pang et al. ................... | 326/38 |
| 6,453,456 B1 | * | 9/2002 | Price ............................ | 716/16 |
| 6,456,961 B1 | * | 9/2002 | Patil et al. .................... | 703/14 |
| 6,460,148 B2 | * | 10/2002 | Veenstra et al. .............. | 714/39 |
| 6,530,071 B1 | * | 3/2003 | Guccione et al. ............. | 716/17 |
| 6,598,178 B1 | * | 7/2003 | Yee et al. ..................... | 714/34 |

* cited by examiner

*Primary Examiner*—Nadeem Iqbal
(74) *Attorney, Agent, or Firm*—LeRoy D. Maunu

(57) ABSTRACT

System and method for debugging a run-time reconfigurable processing arrangement. The processing arrangement includes a host process that hosts a run-time reconfiguration application program and a programmable logic device (PLD). The run-time reconfiguration program specifies a circuit design with references to core generators in a library, generates configuration data that implements the circuit design on the PLD, and configures the PLD with the configuration data. One of the core generators generates a breakpoint circuit that steps the PLD for a selected number of clock cycles. When the PLD is activated, the breakpoint circuit steps the PLD, and state information of one or more selected elements of the PLD is analyzed after stepping the PLD. Depending on the analysis, the breakpoint core generator is re-parameterized and the PLD reconfigured with a new breakpoint circuit to continue debugging.

19 Claims, 3 Drawing Sheets

PARAMETERIZABLE AND RECONFIGURABLE DEBUGGER CORE GENERATORS

GOVERNMENT CONTRACT

The U.S. Government has a paid-up license in this invention and the right in limited circumstances to require the patent owner to license others on reasonable terms as provided for by the terms of DABT63-99-3-0004 awarded by DARPA.

FIELD OF THE INVENTION

The present invention generally relates to debugging hardware and software arrangements, and more particularly to debugging run-time reconfigurable processing arrangements.

BACKGROUND

Logic cores are generally used as building blocks in creating electronic circuit designs. A logic core typically is a design that when implemented in hardware performs a predetermined function and which has input and output signal lines that can be connected to other logic. For example, one particular logic core may implement a digital filter, and another logic core may implement a constant multiplier.

The traditional tools for creating logic cores generally support design entry via schematics or a hardware description language such as HDL or VHDL. In addition, there are a multitude of proprietary languages for creating logic cores that are specifically suitable for a particular family of devices. Some environments, for example VHDL, support creation of test environments along with the design itself.

In the context of programmable logic devices (PLDs), for example, field programmable gate arrays (FPGAs) from Xilinx, there are numerous tools available for testing the functionality of circuits created from logic cores. The tools include functional and physical simulators, BoardScope™ graphical debugger software, and XHWIF™ hardware interface software.

New developments in the area of creating designs for PLDs are rendering the prior test methodologies and tools inadequate. For example, circuit designs, including run-time parameterizable logic core generators, can be created in the JBits™ environment from Xilinx. The JBits environment is a Java-based tool that includes an application programming interface (API) that allows designers to develop logic and write a configuration bitstream directly to a Xilinx FPGA. The JBits API permits the FPGA bitstream to be modified quickly, allowing for fast reconfiguration of the FPGA. In a run-time reconfiguration system, circuits are configured and then reconfigured based on information supplied in real-time by user software, user data, or sensor data. With Virtex FPGAs, the JBits API can be used to partially or fully reconfigure the internal logic of the hardware device. The JBits environment also supports run-time reconfiguration of FPGAs and also configuration of FPGAs over a communications network, for example, an intranet or the Internet.

Run-time reconfigurable systems are generally co-processor systems. A host processor executes a run-time reconfiguration program, and the run-time reconfiguration program implements application functions on the host processor, defines a circuit design, creates configuration data, and configures the FPGA. Since the host processor and the FPGA are likely to be independently clocked, debugging a co-processor system is difficult.

Current techniques for debugging co-processor systems generally involve using simulators on the FPGA circuit and/or debug cores inserted into HDL logic. Simulation does not support real-time debugging. While debug cores support real-time debugging, debug cores are static and provide little user control over the structure. Neither simulation nor debug cores provides a suitable environment for debugging co-processor arrangements.

A system and method that addresses the aforementioned problems, as well as other related problems, is therefore desirable.

SUMMARY OF THE INVENTION

In various embodiments, a system and method are provided for debugging a run-time reconfigurable processing arrangement. The processing arrangement includes a host process that hosts a run-time reconfiguration application program and a programmable logic device (PLD). The run-time reconfiguration program specifies a circuit design with references to core generators in a library, generates configuration data that implements the circuit design on the PLD, and configures the PLD with the configuration data. One of the core generators generates a breakpoint circuit that steps the PLD for a selected number of clock cycles. When the PLD is activated, the breakpoint circuit steps the PLD, and state information of one or more selected elements of the PLD is analyzed after stepping the PLD. Depending on the analysis, the breakpoint core generator is re-parameterized and the PLD reconfigured with a new breakpoint circuit to continue debugging.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Various embodiments of the present invention are described in terms of the JBits API and Virtex™ FPGAs from Xilinx. However, those skilled in the art will appreciate that the invention could be implemented in other programming languages and applied to programmable logic devices (PLDs) other than FPGAs depending on system requirements. Thus, references to JBits and FPGAs are intended to serve as example embodiments only.

In the various embodiments of the invention shown in the figures and described below, run-time reconfigurable debugger core generators are used for debugging a co-processor system. The co-processor system includes a run-time reconfiguration application that executes on a host processor and a circuit implemented on a PLD. The debugger core generator is used by the run-time reconfiguration application in the same way that other run-time reconfigurable core generators are used. That is, the application selects, instantiates, and defines parameters for the debugger core generator just as the application does with other cores generators. Thus, the co-processor system can be debugged in real-time using parameterizable debugger core generators in conjunction with debugging the run-time reconfiguration application.

Figure 1:
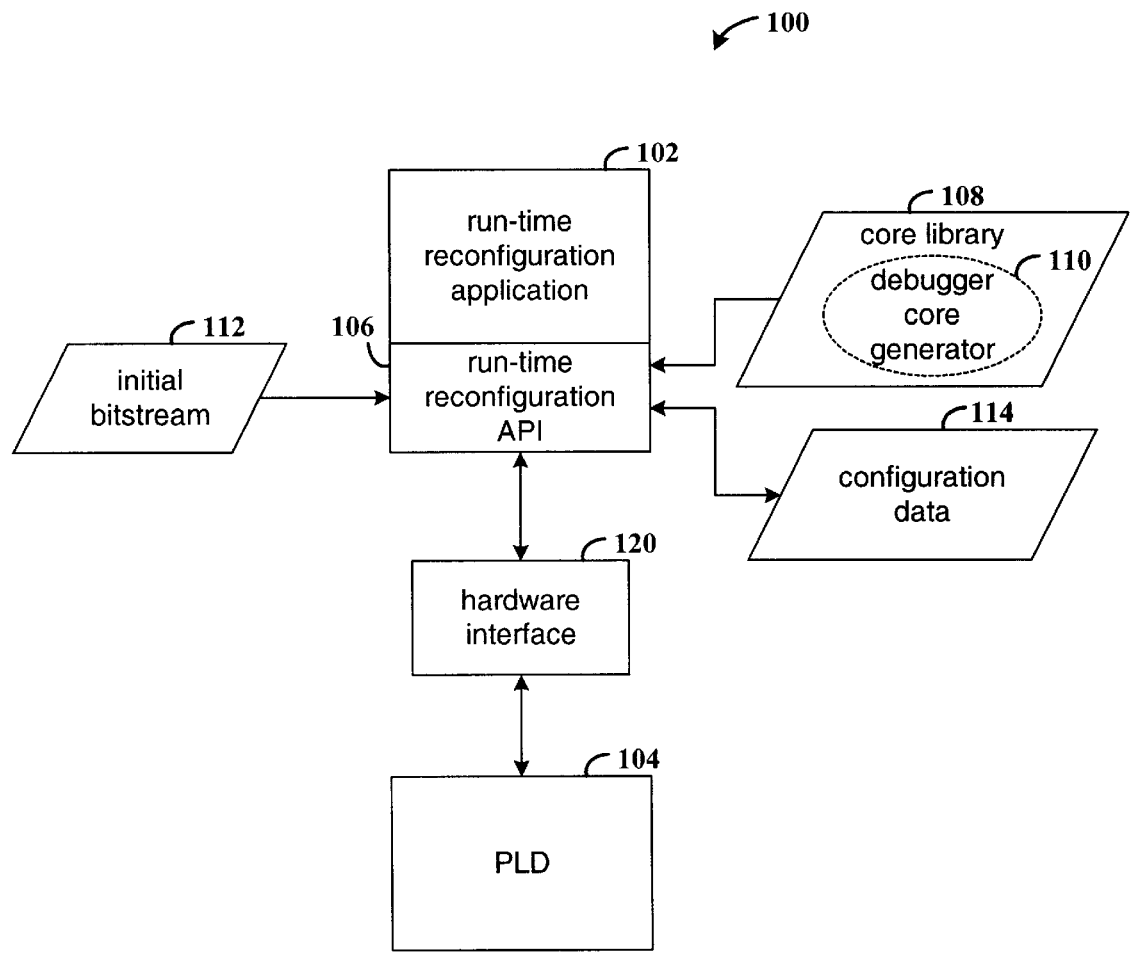
FIG. 1 is a functional block diagram of a reconfigurable computing arrangement in accordance with one embodiment of the invention.

FIG. 1 is a functional block diagram of a reconfigurable computing arrangement 100 in accordance with one embodiment of the invention. Arrangement 100 includes a run-time reconfiguration application program 102 that is written in the Java® language, for example. The application 102 is written to perform various functions relative to the environment in which arrangement 100 is used. For example, in addition to configuration and/or runtime reconfiguration of PLD 104, the application is programmed to provide user-interface functions or interact with components outside arrangement 100.

Run-time reconfiguration API 106 allows application 102 to manipulate configurable resources of PLD 104. The bit-level interface also includes a set of functions, one or more of which are invoked when the user application program 102 references the API 106. Application 102 and API 106 are hosted by a conventional data processing arrangement.

Application 102 uses API 106 to read an initial bitstream 112. For purposes of run-time modification, the initial bitstream is formatted as configuration data 114, and based on the application logic the configuration data is changed and/or supplemented using core library 108. To configure PLD 104, the runtime reconfiguration application assembles configuration data 114 and downloads the configuration data to PLD 104 via hardware interface 120.

Hardware interface 120 includes a portable layer of software and accompanying hardware to couple application 102 to PLD 104. For example, in one embodiment hardware interface 120 is the Xilinx Hardware Interface (XHWIF).

API 106 is provided with core library 108 that includes a collection of macrocell or "core" generators that are implemented as Java classes. The cores are generally parameterizable and relocatable within a device. Examples of cores include counters, adders, multipliers, constant adders, constant multipliers, flip-flops and other standard logic and computation functions. In addition, core library 108 includes debugger core generator 110. While only one debugger core generator is shown, it will be appreciated that library 108 may include multiple debugger core generators, each functioning differently.

Debugger core generators include, for example, breakpoint core generators and tracer core generators. A breakpoint core generator generates configuration data that implements a circuit on the PLD that controls the system clock of the PLD. An example breakpoint core generator steps the PLD clock a selected number of cycles and is resetable. A parameter provided by the application 102 to the breakpoint core generator specifies the number of clock cycles. Since the breakpoint generator is parameterizable, the breakpoint circuit can be regenerated to step the PLD for a different number of cycles, and the PLD can be run-time reconfigured to implement the breakpoint circuit. It will be appreciated that the run-time reconfiguration application 102 could automatically select new parameters or query the person controlling the debugging session.

A breakpoint core may also trigger on some logic condition, such as when a signal is at a certain logic state or transitions, or when a bus has a certain value. These conditions, signals, and buses may be specified as additional optional parameters to the breakpoint core. For example, signals such as nets and buses are specified by name. In an object-oriented programming language such as Java, each instance of a net or bus is represented as a distinct object of the class Signal, which is equivalent to specifying signals uniquely by their fully qualified names. The following method calls illustrate overloading of the breakpoint condition:

breakpoint(clock, n); // breakpoint after n cycles of the clock signal breakpoint(interrupt, HIGH); // breakpoint when the interrupt signal is high breakpoint(done, LOW_TO_HIGH); // breakpoint when the done signal has a low to high transition breakpoint(address, 0xfdde); // breakpoint when the 16 bit address bus has a hex value of FDDE A tracer core generator stores states of selected signals for a selected number of cycles. The circuit implemented by the tracer core generator is configurable to trigger on various states of different signals, depending on the application requirements.

Figure 2A:
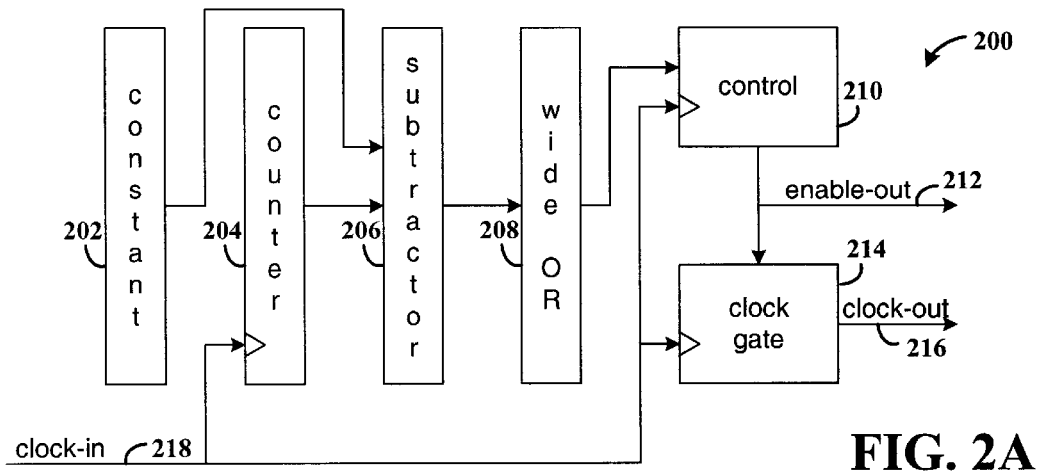
FIG. 2A is a circuit diagram of an example breakpoint circuit.

FIG. 2A is a circuit diagram of a breakpoint circuit in accordance with one embodiment of the invention. Breakpoint circuit 200 is generated from a breakpoint core generator, and each of the blocks that comprise circuit 200 is generated from other core generators in core library 108. Breakpoint circuit 200 receives a clock-in signal and pulses a clock-out signal for a number of pulses, which is run-time reconfigurable. The breakpoint circuit is automatically reset when the PLD is reconfigured.

Breakpoint circuit 200 is configured via a parameter that specifies the number of clock cycles to pass, and the parameter value is stored in constant register 202. Counter 204 counts up to the parameter value and then resets to 0 to begin counting again. Subtractor 206 subtracts the counter value from the constant value, and the output signals representing the difference are input to wide OR gate 208. The state of the output signal from wide OR gate 208 will be logic level 0 when the constant value is equal to the counter value and logic level 1 when the values are not equal. Those skilled in the art will appreciate that a wide AND gate in combination with an inverter could be substituted for the wide OR gate 208.

The output signal from the wide OR gate 208 is input to control logic 210. Control logic 210 implements a finite state machine that activates the enable-out signal on line 212 for the number of clock cycles specified by the value in constant register 202. The enable signal from the control logic is also input to a clock gate 214 that pulses the clock-out signal on line 216 while enabled by the control logic.

In one embodiment, control logic 210 is comprised of two transition detectors and a finite state machine that inspects the states of the transition detectors. The two transition detectors identify state changes from 0 to 1 and from 1 to 0, respectively, of the signal from wide OR gate 208. The states of the transition detectors are inspected by a finite state machine that activates or deactivates the enable-out signal in response to the states of the transition detectors.

The clock-in signal is provided on line 218 and clocks the counter 204, control logic 210, and clock gate 214.

Figure 2B:
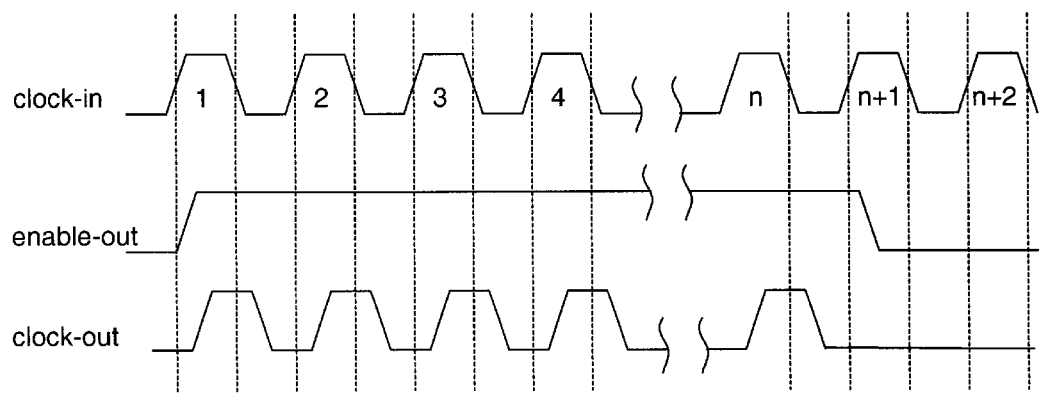
FIG. 2B is a timing diagram that illustrates the relationship between the signals that are input to and output from the breakpoint circuit of FIG. 2A.
Figure 3:
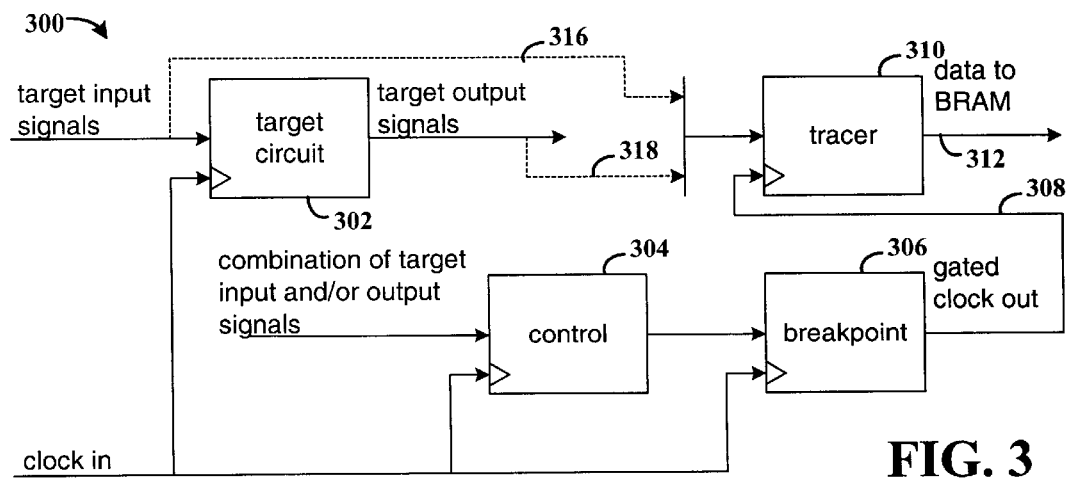
FIG. 3 is a circuit diagram of an example tracer circuit arrangement.

FIG. 2B is a timing diagram that illustrates the relationship between the signals that are input to and output from the breakpoint circuit of FIG. 2A. The clock-in signal is shown for n+2 pulses, where n is the parameter value to the breakpoint core generator that specifies the number of clock pulses to pass. The enable-out signal is active for n pulses, which allows the clock-out signal to pulse n times. The clock-out signal trails the enable-out signal by the time required to activate an AND gate. FIG. 3 is a circuit diagram of a tracer circuit arrangement in accordance with one embodiment of the invention. The tracing circuitry in circuit arrangement 300 is a non-intrusive (relative to some targeted circuitry) that generally captures a sequential flow of events in the selected targeted circuitry.

The tracer circuitry of circuit arrangement 300 is generated from a tracer core generator, which is parameterized by run-time reconfiguration application 102. For example, the number of cycles for which signal states are to be traced is parameterizable. The inclusion of the breakpoint core permits tracing to be triggered under the same conditions that a breakpoint can be triggered, such as when a signal is at a certain logic state or transitions, or when a bus has a certain value. Application 102 selects a target circuit 302 to be traced and connects the tracer circuitry to the target circuit. Control circuit 304 takes as input some combination of input signals to and/or output signals from the target circuit and signals breakpoint circuit 306 when a selected set of signal states is present. Breakpoint circuit 306 generates the gated clock-out signal on line 308, which clocks tracer circuit 310 for a run-time reconfigurable number of cycles. When the gated clock-out signal from the breakpoint circuit pulses, tracer circuit 310 latches the states of selected input/output signals (dashed lines 316 and 318) associated with the target circuit 302 and passes the signals on line 312 for storage in PLD block RAM (BRAM). When the gated clock-out signal is not pulsed, the tracer circuit 310 stops latching signal states and passing the data to the BRAM.

Figure 4:
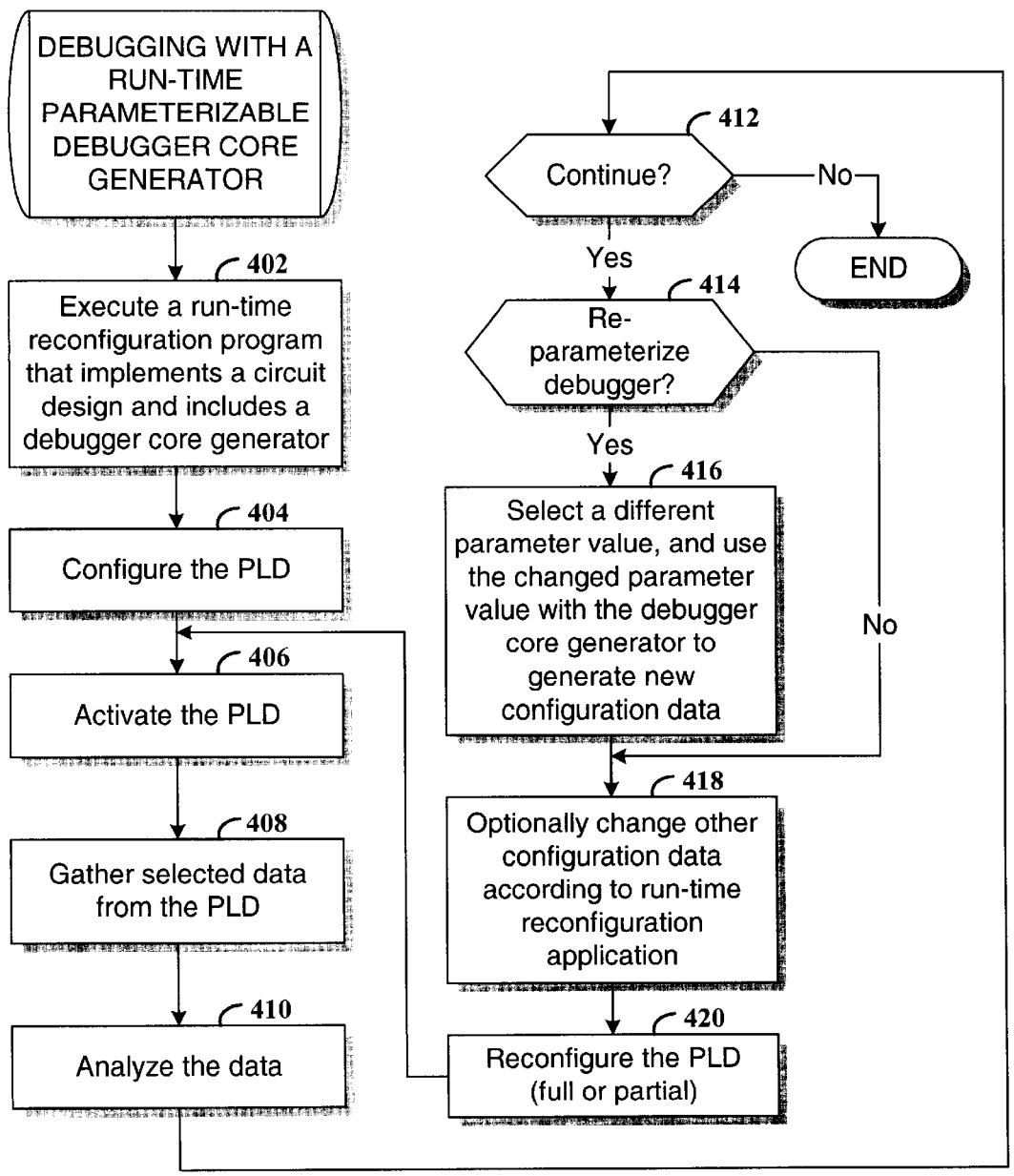
FIG. 4 is a flowchart of a process for debugging using a debugger core generator in accordance with one embodiment of the invention.

FIG. 4 is a flowchart of a process for debugging using a debugger core generator in accordance with one embodiment of the invention. At step 402, a run-time reconfiguration application program is executed, the application including code that generates application circuit configuration data and that invokes a debugger core generator. At step 404, the PLD is configured with the configuration data generated by the run-time reconfiguration application, and the PLD is activated at step 406.

At step 408, selected output data are gathered from the PLD, and at step 410 the data are analyzed. The particular analysis performed is application dependent and is either automated or manual. Decision step 412 determines whether to continue the debugging process. Whether the process continues depends on the data gathered and the application. If debugging is complete, the process ends. Otherwise, the process continues at decision step 414.

Decision step 414 determines whether the debugger core generator should be re-parameterized. This decision may be made by a user or the run-time reconfiguration application, depending on the implementation. Whether the debugger should be re-parameterized depends on many factors which will vary from application to application. For example, the decision may depend on whether an error has been detected or whether the user wants to trace some other signals in the circuit. The process proceeds to step 416 if the debugger is to be re-parameterized. Otherwise, the process skips step 416 and continues at step 418.

At step 416, a different parameter value is selected for the debugger core generator, and new configuration data is generated by the debugger core generator using the changed parameter value. The new parameter value, for example, changes the number of clock cycles pulsed by a breakpoint circuit. Depending on the application and the level of automation provided in the debugging process, the parameter value may be manually or automatically generated.

At step 418, other parts of the configuration data are optionally changed, depending on the application. The PLD is then reconfigured at step 420. The reconfiguration may be full or partial, depending on the configuration capabilities of the PLD and the particular application. The process then continues at step 406, where the debugging and re-parameterization process is repeated.

The present invention is believed to be applicable to a variety of systems for run-time reconfiguration of PLDs and has been found to be particularly applicable and beneficial with application programs developed from run-time reconfiguration of FPGAs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for debugging a run-time reconfigurable processing arrangement including a processor arrangement coupled to a programmable logic device (PLD), comprising:
   executing on the processor arrangement a run-time reconfiguration program that includes executable code that specifies a circuit design with references to core generators in a library, generates configuration data that implements the circuit design on the PLD, and configures the PLD with the configuration data, wherein one of the core generators generates a breakpoint circuit that steps the PLD for a selected number of clock cycles;
   activating the PLD;
   stepping the PLD for the selected number of clock cycles by the breakpoint circuit on the PLD; and
   checking state information of one or more selected elements of the PLD after stepping the PLD.

2. The method of claim 1, wherein the portion of the circuit design that specifies a breakpoint circuit is parameterizable.

3. The method of claim 2, wherein the selected number of clock cycles stepped by the breakpoint circuit is parameterizable.

4. The method of claim 3, further comprising under control of the run-time reconfiguration program:
   associating a new parameter value with the breakpoint circuit after stepping the PLD for the selected number of cycles;
   generating new configuration data for the breakpoint circuit with the new parameter value; and
   configuring the PLD with the new configuration data.

5. The method of claim 4, wherein the PLD is configured with the new configuration data by partially reconfiguring the PLD.

6. The method of claim 1, wherein a portion of the circuit design specifies a tracing circuit that is coupled to and enabled by the breakpoint circuit and coupled to receive selected signals associated with the circuit design, the method further comprising:
   enabling the tracing circuit with a signal from the breakpoint circuit after stepping the PLD for a selected number of clock cycles; and
   storing states of the selected signals by the tracing circuit.

7. The method of claim 1, wherein the portion of the circuit design that specifies the breakpoint circuit is parameterizable by a selected signal with a selected state that triggers stepping the PLD by the breakpoint circuit.

8. The method of claim 7, further comprising under control of the run-time reconfiguration program:
   associating a new parameter value with the breakpoint circuit after stepping the PLD for the selected number of cycles;
   generating new configuration data for the breakpoint circuit with the new parameter value; and
   configuring the PLD with the new configuration data.

9. The method of claim 8, wherein the PLD is configured with the new configuration data by partially reconfiguring the PLD.

10. The method of claim 1, wherein the portion of the circuit design that specifies the breakpoint circuit is parameterizable by a state transition of a selected signal that triggers stepping the PLD by the breakpoint circuit.

11. The method of claim 10, further comprising under control of the run-time reconfiguration program:
   associating a new parameter value with the breakpoint circuit after stepping the PLD for the selected number of cycles;
   generating new configuration data for the breakpoint circuit with the new parameter value; and
   configuring the PLD with the new configuration data.

12. The method of claim 11, wherein the PLD is configured with the new configuration data by partially reconfiguring the PLD.

13. An apparatus for debugging a run-time reconfigurable processing arrangement including a processor arrangement coupled to a programmable logic device (PLD), comprising:
   means for generating configuration data that implements a circuit design during execution of a run-time reconfiguration program that specifies the circuit design with references to core generators in a library and configuring the PLD with the configuration data, wherein one of the core generators generates a breakpoint circuit that steps the PLD for a selected number of clock cycles;
   means for activating the PLD;
   means for stepping the PLD for the selected number of clock cycles by the breakpoint circuit on the PLD; and
   means for checking state information of one or more selected elements of the PLD after stepping the PLD.

14. A system for debugging a run-time reconfigurable processing arrangement, comprising:
   a programmable logic device (PLD); and
   a processor arrangement coupled to the PLD and hosting a run-time reconfiguration application program, a run-time reconfiguration program interface, and a library of core generators, the run-time reconfiguration program including executable code that, via the program interface, specifies a circuit design with references to core generators in the library, generates configuration data that implements the circuit design on the PLD, and configures the PLD with the configuration data, wherein one of the core generators referenced by the application program generates a breakpoint circuit that steps the PLD for a selected number of clock cycles.

15. The system of claim 14, wherein the core generator that generates the breakpoint circuit is parameterizable.

16. The system of claim 15, wherein the selected number of clock cycles stepped by the breakpoint circuit is parameterizable.

17. The system of claim 16, wherein the run-time reconfiguration program further includes code that associates a new parameter value with the breakpoint circuit after stepping the PLD for the selected number of cycles, generates new configuration data for the breakpoint circuit with the new parameter value, and reconfigures the PLD with the new configuration data.

18. The system of claim 17, wherein the PLD is partially reconfigurable, and the run-time reconfiguration program partially reconfigures the PLD with new configuration data via the program interface.

19. The system of claim 14, wherein a portion of the circuit design specifies a tracing circuit that is coupled to and enabled by the breakpoint circuit and coupled to receive selected signals associated with the circuit design, wherein the breakpoint circuit enables the tracing circuit after stepping the PLD for a selected number of clock cycles, and the tracing circuit stores states of the selected signals.

* * * * *